United States Patent
Eggleton et al.

(10) Patent No.: US 6,885,792 B2
(45) Date of Patent: Apr. 26, 2005

(54) WAVELENGTH MONITORING OPTICAL FIBERS USING DETECTION IN THE NEAR FIELD

(75) Inventors: Benjamin J. Eggleton, Summit, NJ (US); Kenneth S. Feder, Murray Hill, NJ (US); Paul S. Westbrook, Chatham, NJ (US)

(73) Assignee: Furukawa Electric North America Inc., Norcross, GA (US)

( * ) Notice: Subject to any disclaimer, the term of this patent is extended or adjusted under 35 U.S.C. 154(b) by 46 days.

(21) Appl. No.: 10/253,445

(22) Filed: Sep. 24, 2002

(65) Prior Publication Data

US 2004/0056183 A1 Mar. 25, 2004

(51) Int. Cl.[7] ................................................. G02B 6/34
(52) U.S. Cl. .......................................................... 385/37
(58) Field of Search ..................................... 385/37, 48

(56) References Cited

U.S. PATENT DOCUMENTS

| | | | | |
|---|---|---|---|---|
| 4,191,446 A | * | 3/1980 | Arditty et al. | 385/42 |
| 4,335,933 A | * | 6/1982 | Palmer | 385/36 |
| 5,042,897 A | * | 8/1991 | Meltz et al. | 385/37 |
| 5,061,032 A | * | 10/1991 | Meltz et al. | 385/37 |
| 5,647,039 A | * | 7/1997 | Judkins et al. | 385/37 |
| 5,832,156 A | * | 11/1998 | Strasser et al. | 385/48 |
| 6,058,226 A | * | 5/2000 | Starodubov | 385/12 |
| 6,385,369 B1 | * | 5/2002 | Hill et al. | 385/37 |

* cited by examiner

*Primary Examiner*—Joseph Williams
*Assistant Examiner*—Peter Macchiarolo
(74) *Attorney, Agent, or Firm*—Peter V.D. Wilde

(57) ABSTRACT

The specification describes a wavelength monitoring system for multiple wavelength communications systems, such as WDM systems, based on the recognition that the mechanism for spatially separating the individual wavelength bands can be achieved within the optical fiber itself. Individual wavelength bands are separated using a series of discrete gratings spaced longitudinally along the fiber core. The wavelength bands are extracted from the fiber core by converting the energy in the selected band from a core-guided mode to a radiation mode. By using a tilted grating, the light in the radiation mode is directed through the cladding and out of the fiber. Spatial resolution of the selected bands can be any desired physical length. An important implication of this is that detection can be made in the near field using inexpensive detecting apparatus. Near field is defined for convenience in this case as the optical field of the radiated energy without any optically modifying elements (collimating devices, diffraction elements, mirrors, etc.). This eliminates nearly all of the optics, and the attendant expense, in prior art monitoring systems.

14 Claims, 4 Drawing Sheets

WAVELENGTH MONITORING OPTICAL FIBERS USING DETECTION IN THE NEAR FIELD

FIELD OF THE INVENTION

This invention relates to wavelength monitoring devices, and more particularly to wavelength monitors that monitor signals over a wide band of wavelengths.

BACKGROUND OF THE INVENTION

Optical transmission systems employ Wavelength Division Multiplexing (WDM) to increase information handling of an optical fiber transmission line, typically a long haul transmission line. In these systems, multiple signal bands are combined (multiplexed) onto a single transmission line. On reaching the receiving station, the signal bands are separated (demultiplexed) into separate channels.

Early WDM systems operated with a relatively narrow wavelength bandwidth, centered around 1550 nanometers, e.g. 1530–1565 nanometers, often referred to as the C-band. This is the wavelength region where standard silica based optical fibers have optimally low absorption.

In most WDM systems there is a trade-off between the number of channels the system accommodates and the channel separation. Both goals favor a wide operating spectrum, i.e. a wide range of operating wavelengths.

Recently, systems have been designed that extend the effective operating wavelength range well above the C-band transmission band. In terms of wavelength, the new band, referred to as the L-band, is variously defined, but for the purpose of this description is 1570–1610 nanometers. Use of these added wavelengths substantially extends the capacity of WDM systems. There is an ongoing effort to further extend the effective operating wavelength window to above 1610 nm, for example to 1620 nm. In WDM systems, it is important to have uniform gain over the entire WDM wavelength band. This objective becomes more difficult to reach as the operating wavelength range is extended to longer wavelengths.

It is often desirable to monitor the multiplexed signal in transit. Monitoring may provide several functions. Modern communication networks are designed for broad-band operation, but are still inherently wavelength sensitive. For example, signal loss is typically not uniform over a wide wavelength band. Monitoring the power in each band allows equalizer devices to operate. These may function by using the monitored power levels to provide feedback signals to channel amplifiers, typically at the WDM source.

While monitoring systems are important for system maintenance, signal taps of a multiplexed signal during transit may also involve using the information in the multiplexed signals. In a typical system maintenance application, the signals are analyzed for transmission performance but the information content is irrelevant. However, applications exist for tapping the signal content, for example in line drops, or for eavesdropping.

Conventional channel monitoring systems are usually variants of commercial spectrometers. Typical spectrometers rely on the interference of a finite number of beams that traverse different optical paths to form a signal. The spectrometer disperses the incoming light into a finite number of wavelength (energy) intervals, where the size of the resolution element is set by the bandwidth limit imposed by the dispersing element. Different dispersive techniques may be used. The two most common types of spectrometers are the grating spectrometer and the scanning Fabry-Perot spectrometer.

An example of a wavelength monitoring system using spectrometer principles applied to an optical fiber tap is described in U.S. Pat. No. 5,832,156 (incorporated herein by reference). Both Bragg grating and scanning Fabry-Perot spectrometer principles are implemented in that patent. The multiplexed signal, comprising all of the bands being monitored, is tapped from the optical fiber, and dispersion optics is used to spatially resolve the wavelength bands. The spatial resolution depends in each case on the amount of angular separation the optics can generate due to chromatic dispersion of the multiplexed beam.

Spectrometers in general are inherently complex and expensive. A large part of the expense is due to the optics used for resolving the different wavelength bands in the far field. With the trend in WDM systems toward more channels and less separation, the optics needed to resolve these wavelength bands becomes very demanding. A simpler and less expensive wavelength monitoring system would represent a significant contribution to the technology.

STATEMENT OF THE INVENTION

We have designed a simple, relatively inexpensive, wavelength monitoring system. It is based on the recognition that the mechanism for spatially separating the individual wavelength bands can be operative within the optical fiber itself. Individual wavelength bands are separated using discrete gratings that are spaced longitudinally along the fiber core. The wavelength bands are extracted from the fiber core by converting the energy in the selected band from a core guided mode to a radiation mode. By using a tilted grating, light in the radiation mode is directed through the cladding and out of the fiber. Spatial resolution of the selected bands can be any desired physical length. An important implication of this is that the wavelength sensitivity and hence detection can be made in the near field using inexpensive detecting apparatus. Near field is defined, for convenience in this case, as the optical field of the radiated energy without any optically modifying elements (collimating devices, diffraction elements, etc.). This eliminates nearly all of the optics, and the attendant expense, in prior art monitoring systems. In some embodiments, simple inexpensive beam steering elements may be used. However, the vitalizing feature is that the essential separation between wavelength bands is achieved within the optical fiber, and no dispersive elements are required for the detection apparatus.

DETAILED DESCRIPTION

Figure 1:
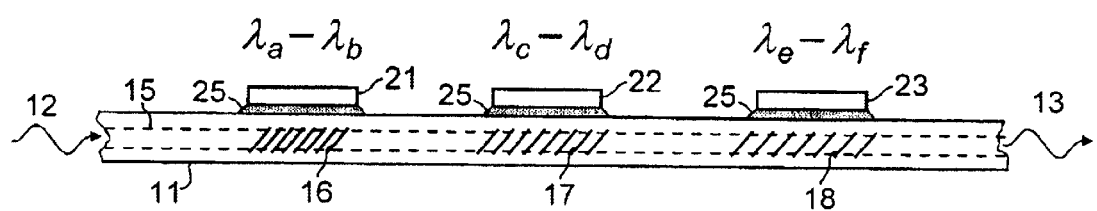
FIG. 1 is a schematic diagram of a multiple tap system according to the invention.

Referring to FIG. 1, the arrangement shown represents the distributed multiple tap of the invention. Optical fiber 11 is shown with input signal 12 and output signal 13. In this embodiment, the taps are partial taps, i.e. the main signal propagates to the output. In alternative embodiments, the multiple tap can be used as a multiple drop, for example, in a demultiplexer system, in which case there may be no output signal at 13. The core of the optical fiber is represented by dashed lines 15. In the typical system, the optical fiber is a single mode fiber. The core 15 contains a series of tilted gratings 16, 17 and 18, which are preferably Bragg gratings. The number of gratings corresponds to the number of taps desired. FIG. 1 shows three gratings for tapping three wavelength bands $\lambda_a$–$\lambda_b$, $\lambda_c$–$\lambda_d$, and $\lambda_e$–$\lambda_f$. Fewer, or typically more, may be used depending on the system requirements.

Associated with each grating is a photodetector 21, 22, 23, aligned to receive light radiated from the gratings 16, 17, and 18 respectively. Coupling efficiency may be improved by using an index matching material 25. Significantly, the distance between gratings 16, 17, and 18 is arbitrary. This is due to the property of the system wherein the mechanism for spatially separating the individual wavelength bands is operative within the optical fiber itself. So, for example, the center-to-center spacing of two gratings in a sequence may be any value greater than the length (with respect to the fiber core) of the photodetector. The length of the photodetector is at least the length of the surface through which tapped radiation passes. To avoid crosstalk between adjacent gratings, it is preferred that the center-to-center spacing of the gratings be at least 1.5 of the length of the photodetector.

Signal light in the core 15 of the optical fiber normally travels in a fundamental (or near fundamental) mode, i.e. $LP_{01}$ (or $LP_{11}$, $LP_{02}$). On encountering the grating, light with a wavelength band corresponding to the resonance wavelength of the grating is coupled from the fundamental mode to a radiated mode. Because the grating is tilted, the radiated mode light exits the fiber through the cladding. The radiated light is detected by photodetectors 21, 22 and 23. By placing the detector at or near the surface of the optical fiber, a significant portion of the radiated light is captured. The distance from the surface of the cladding of the optical fiber and the surface of the photodetector element is preferably 0–1 mm. In the preferred case, there are no optical elements between the surface of the optical fiber and the surface of the photodetector. In some cases it may be useful to insert beam steering optics between the optical fiber and the photodetector to facilitate alignment. It may also be useful to insert an optical element comprising a narrow bandpass filter for narrowing the wavelength band and reducing potential noise and cross talk between detectors.

Figure 2:
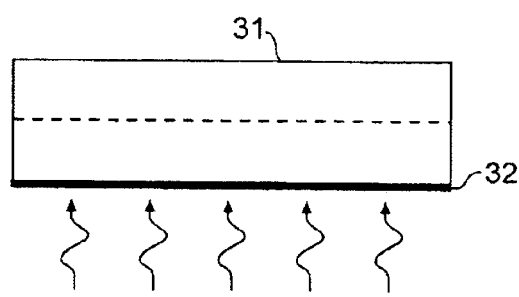
FIG. 2 is a view of a photodetector, according to one embodiment, for the system of FIG. 1.

The latter expedient is conveniently implemented using an arrangement represented by FIG. 2, where the radiated mode light is represented by the arrows, and element 31 is a diode photodetector. The face of the photodetector, where the light is incident, is coated with a filter 32. Anti-reflection coatings may also be used.

In some cases the efficiency with which light is coupled to a radiated mode, and therefore tapped using the tap just described, will be polarization dependent. Therefore, polarization compensating elements may also be incorporated into the system either in line in the optical fiber or between the optical fiber and the photodetector. For an example of the former element see L. S. Yan, Q. Yu, A. E. Willner, "Demonstration of In-line Monitoring and Compensation of Polarization-Dependent Loss for Multiple Channels" IEEE Phot. Tech. Let., Vol. 14, No. 6, June 2002, incorporated herein by reference.

Figure 3:
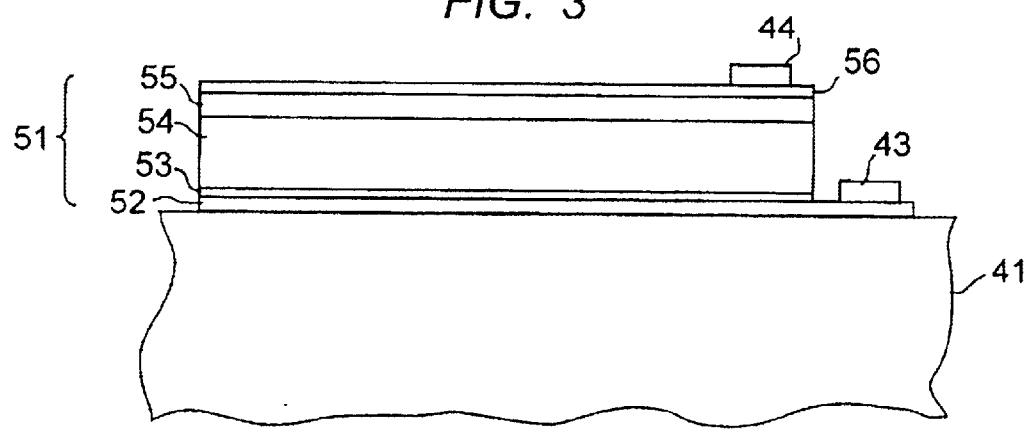
FIG. 3 is a more detailed view of one example of a suitable semiconductor diode photodetector.

A suitable semiconductor diode photodetector is shown in greater detail in FIG. 3. In the preferred case, the semiconductor diodes are p-i-n photodiodes, of, for example, InGaAs or InP. In the example shown, the substrate 41 is standard semi-insulating InP:Fe. The active p-i-n photodiode stack is shown generally at 51. A portion of the bottom contact layer is exposed, as shown at 52, to accommodate an electrode contact 43 to this layer. The p-i-n photodiode stack 51 also comprises an etch stop layer 53, intrinsic absorbing layer 54, $p^+$ contact layer 55, and metal contact layer 56. The metal interconnect 44 contacts a portion of the p-layer as shown.

The bottom of the $n^+$ contact layer may be made transparent to the light incident on the detector so the detector can be back-illuminated. In that case, the material of the bottom contact layer may be quaternary: InGaAsP, with a composition $In_{1-x}Ga_xAs_yP_{1-y}$, where x is approximately 0.3, and y is approximately 0.72. This material is transparent in the 1480–1600 nm wavelength range used in typical lightwave systems. While this material and composition is given by way of example, any suitable III–V compound semiconductor diode may be used as the photoconductor element. The system described here is designed for operation in a collective wavelength band around 1.5 $\mu$m. Similar systems may be designed for operation around 1.3 $\mu$m.

Figure 4:
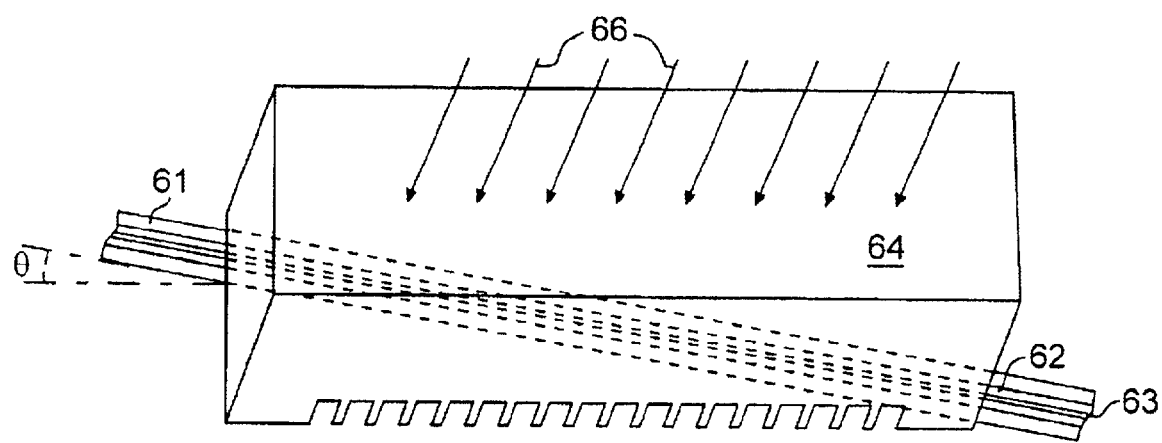
FIG. 4 is a schematic view of a technique useful for producing gratings in the core of an optical fiber.

The tilted gratings 16, 17, and 18 of FIG. 1 may be made by a conventional technique. FIG. 4 is a schematic diagram illustrating one suitable method for writing a grating into the core of an optical fiber by projecting radiation through a phase mask, and through the cladding to the core of the optical fiber. The figure illustrates a technique wherein the grating is written through the coating on the optical fiber. Alternatively, and depending on the optical characteristics of the coating material, the coating may be removed for this operation. FIG. 4 shows an optical fiber with polymer coating 61, cladding 62, and core 63. A UV laser source, represented by arrows 66, is shown incident on an $SiO_2$ phase mask 64. UV radiation is diffracted into a light pattern of fine lines by the phase mask, and is incident on the fiber core 63. The fiber core is doped with Ge, which, in addition to providing a high refractive index, renders the core material sensitive to UV radiation. The UV radiation causes the refractive index to change locally, where the grating bands are incident. A useful UV source for forming the grating is an excimer laser-pumped frequency doubled dye laser operating at a wavelength around 242 nm, although other sources may be employed. In general, to be effective in forming the desired refractive index changes, the radiation should be in the band 235–260 nm. More details on this process can be found in U.S. Pat. No. 5,620,495.

The phase mask 54 in FIG. 4 is tilted at an angle $\Theta$ with respect to the optical fiber. The tilt angle $\Theta$ may vary but is typically in the range of 1–20 degrees. Since the coupling of the radiated mode to the photodetector is influenced in part by the tilt angle, all of the gratings in the multiple tap system will normally have the same tilt. However, systems may be encountered wherein the coupling is wavelength dependent, and the tilt of the gratings may be varied to equalize the output power in the bands. An advantage of the arrangement of the invention is the short path length between the light in the radiated mode from the tilted grating and the photodetector. The tilted grating may be extended into the cladding to increase the effectiveness of the coupling. In that case, a Ge-doped cladding may be used to facilitate forming the grating in the cladding. FIG. 4 shows a tilt in the fiber that is in the same plane as the face of the face mask. Equivalent results can be obtained with the fiber tilted away from the plane of the mask.

Figure 5:
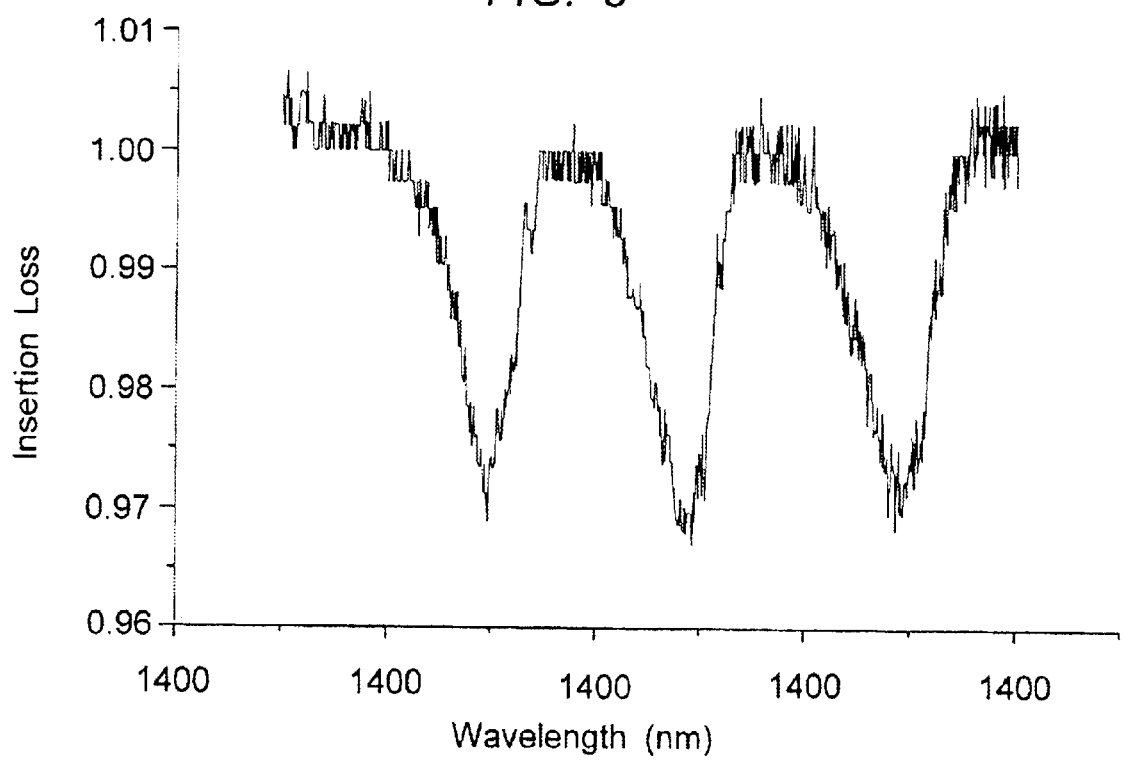
FIG. 5 is a plot of insertion loss vs. wavelength showing the transmission spectra of a tilted tap grating.

The effectiveness of the device of the invention was demonstrated by fabricating a multiple tap grating like that shown in FIG. 1. The three fiber gratings in the device were each 2 mm long and spaced such that the total length of the three gratings was 19.4 mm. The gratings were written in Deuterium loaded fiber by flood exposure at 242 nm. The fiber was designed with photosensitive core and cladding in an attempt to minimize the cladding bandwidth. The chirp of the phase mask used during exposure and the desired center wavelengths of the device spectra determined the grating spacing. FIG. 5 shows the transmission spectra from a set of taps. Each grating tapped approximately 3% of the incident light at the tap center wavelength. The smooth coupling of core-guided modes to radiation modes, by the tilted grating, is evident.

The cladding bandwidth of tap gratings increases with tilt angle, yet at small angles the reflection of tilted gratings decreases with tilt angle. It was found a reasonable compromise was obtained with a grating tilt of 3.8 degrees. At 3.8 degrees the bandwidth was about 20 nm and the reflectivity 0.8%.

The tap gratings were glued to InGaAs photodiodes with index matching epoxy. Three transimpedance amplifier circuits converted the photodiode output to voltages.

The gratings described above are conventional Bragg gratings, typically with a period less than the vacuum wavelength divided by the mode effective index. However, other grating choices are available. The gratings can be made as Long Period Gratings (LPGs). These gratings are made by techniques similar to conventional Bragg gratings but typically with a period greater than the vacuum wavelength divided by the mode effective index. LPGs are mode-conversion devices that have been used extensively for realizing devices that offer wavelength-selective attenuation in WDM communications systems. These devices can be made to convert light from a core mode to a cladding mode. The cladding mode is easily stripped and radiated to the photodetector. LPGs that couple the core mode to a cladding mode can also be tuned dynamically, by modulating the refractive index of an outer or inner cladding material that is interrogated by a cladding mode of the fiber. The refractive index of such cladding materials can be varied by temperature, the electro-optic effect, or some nonlinear optical effect, depending on the nature of the cladding material used. Alternately, the LPGs may be strained by piezoelectric packages, simple motion control housings or magnetically latchable materials, to tune the core-to-cladding resonance. All these tuning techniques have been applied to LPGs coupling core modes to cladding modes, and offer tunable attenuation over a limited, narrow spectral range. The tuning mechanism may be used to change the wavelength band being tapped from a given tap, or to tune the tap to compensate for system drift. If the tuning wavelength range is large, the number of taps used to monitor a given signal band can be reduced. In many applications it is only required to sample a given band periodically. This allows a single tap to be adjusted to monitor first one band (channel), then another. An adjustable mode converter is described in co-pending application of S. Ramachandran, filed Sep. 4, 2002 and entitled: TUNABLE MODE-CONVERTERS USING FEW MODE FIBERS (incorporated herein by reference).

While the choice of LPGs may increase the overall length of the multiple tap system, that may be a secondary consideration. For example, if the spatial resolution of the system is relatively large, and the gratings therefore are spaced along the fiber with a substantial space between adjacent taps, the grating length may be extended without changing the overall dimensions of the system. This may be especially the case where the length of each grating is made small in order to form weak gratings, but the tap separation is large. The physical length of the gratings where standard Bragg gratings are used will typically be in the range 2000 to 100 microns. This range increases to 1–5 centimeters per wavelength for LPGs. The grating spacing, i.e. the distance between refractive index perturbations within the grating itself, depends on the wavelength band, e.g., $\lambda_a$ to $\lambda_b$ in FIG. 1. The light scattered from the untilted LPG is uniformly distributed azimuthally around the fiber. Coupling efficiency could therefore be increased by employing focusing optics to collect all of the light. For example, an elipsoidally shaped mirror would have the fiber core at one focus and the detector at the other. Thus most of the light would couple to the detector, increasing efficiency and reducing polarization dependence. The LPGs could also be tilted to increase their scattering efficiency in a given azimuthal direction.

Another option for the grating selection is to use chirped gratings. In this case the chirp rate of the grating and the detector spacing would be defined so that a single detector at the surface would measure over a give wavelength range and a subsequent detector would measure over a wavelength range adjacent in wavelength space to the first detector.

The term grating as used herein is intended to include all of the choices mentioned, as well as other wavelength selection means located in the core of the optical fiber. The signal that is processed in this system will typically comprise at least three wavelengths. Where reference is made to wavelengths it will be understood that the individual wavelengths are typically not a precise single frequency, but are narrow wavelength bands. In some WDM systems it may be useful to monitor sub-bands, i.e. wavelength bands that carry less than all channels, but more than one channel. For this application, suitable design parameters for the system described are within the skill of the art. Chirped gratings may be especially useful in this case.

The invention is described above using optical fibers for implementing the bandpass filter of the invention. Similar devices may be constructed using other forms of waveguides, for example planar waveguides in optical integrated circuit (OIC) devices, and also polymer fibers and waveguides.

It is also possible to increase the resolution of the device by increasing the dimension of the core mode and the photosensitive area. This may be accomplished in a multimode fiber with a core diameter of typically 50 microns. In order to improve the resolution and lower backreflections, mode converters would have to be attached to the front and back of the fiber to convert the core mode of a single mode fiber into the fundamental mode of the multimode fiber.

As mentioned earlier, in the preferred embodiment of the device, the photodetectors are located adjacent to the optical fiber. The term adjacent in this context is meant to be literal, i.e. with nothing of the same kind (optical element) intervening. In the embodiments wherein beam steering surfaces (planar or curved) are used, the vitalizing feature is that the space between the photodetector and the optical fiber is devoid of dispersive elements. Typically this means devoid of refractive or diffractive elements.

Also as mentioned earlier, the system described above is useful in a variety of applications wherein the taps are designed to intercept the information contained in the multiple-channel signal. An especially useful species of these is for eavesdropping, i.e. tapping the information content of the signal without detection (the optical analog of wire-tapping). A system designed for this application would use very weak gratings so that only a small portion of the signal power is extracted, e.g. less than 10% of the power in any given wavelength band.

The optical systems described above may be employed most effectively in applications where the wavelength bands being monitored are "coarse" i.e. are spaced at greater than 10 nm, or greater than 20 nm. Many of these applications will involve feedback loops where the outputs of the photodetectors are fed back to the signal source. A significant application in this category involves monitoring of the gain envelope of e.g., fiber amplifiers or other slowly varying wavelength responses. The outputs of the photodetector are fed back to a dynamic gain flattening filter to equalize the gain envelope. Other applications, not involving feedback means, include demultiplexing of channels in a "coarse WDM" system in which channel spacing is typically 20 nm or more.

Figure 6:
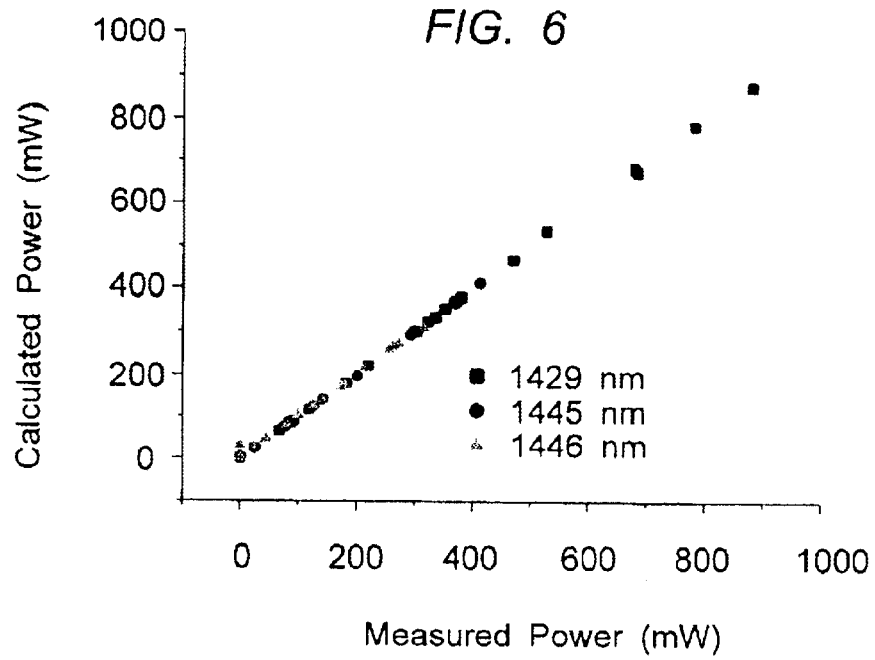
FIG. 6 is a plot of measured vs. calculated power for a three wave Raman Fiber Laser.

The application of the device of the invention to a monitoring system for a Raman Fiber Laser (RFL) is illustrated by the data shown in FIG. 6. The data is plotted as measured power vs. calculated power for nineteen sets of three RFL power values at 1429, 1445, and 1466 nm. The tap voltages were all found to be linear with input power. Crosstalk between taps was found to vary between 17 and 25 dB, and was also linear with power. The sum of the power in the three wavelengths was varied between 0 and 1.1 Watts.

Optical fiber suitable for use with the invention may be any of a variety of conventional optical fibers. A particularly useful type is the so-called D-fiber. The photodetector devices may be mounted conveniently on the flat portion of the fiber.

Figure 7:
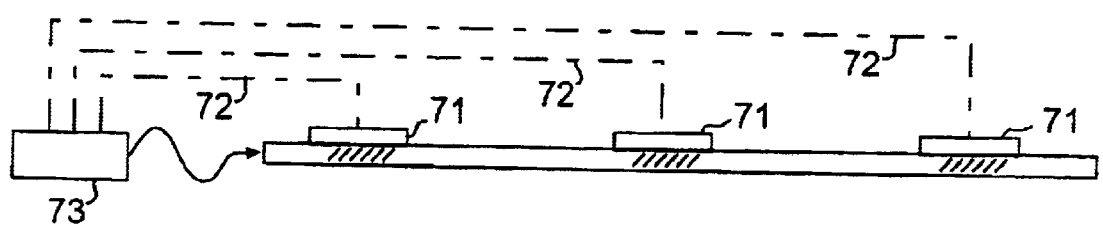
FIG. 7 is a schematic representation of feedback loops 72 (dashed lines) where the outputs of the photodetectors 71 are fed back to the signal source 73. The source 73 may be a signal source or may be a wavelength dependent attenuator.

FIG. 7 shows a schematic representation of feedback loops (dashed lines) where the outputs of the photodetectors are fed back to the signal source.

Various additional modifications of this invention will occur to those skilled in the art. All deviations from the specific teachings of this specification that basically rely on the principles and their equivalents through which the art has been advanced are properly considered within the scope of the invention as described and claimed.

What is claimed is:

1. An optical system comprising:
   a. a length of optical fiber having a core and a cladding,
   b. lightwave signal means for introducing a lightwave signal into the core, the lightwave signal comprising N wavelengths where N is at least three,
   c. a plurality of N refractive index gratings within the core, each of the N gratings adapted for selecting one of the N wavelengths, and
   d. a plurality of N photodetectors with a photodetector associated with each of the N gratings and wherein the N photodetectors:
      1) are located adjacent to and within 0–1 mm of the surface of the optical fiber, and
      2) have a length L as measured parallel to the axis of the optical fiber, and adjacent gratings have a center-to-center spacing of at least 1.5L.

2. The optical system of claim 1 further characterized by the absence of optically dispersive means between the photodetector and the optical fiber.

3. The optical system of claim 1 wherein the photodetector contacts the surface of the optical fiber.

4. The optical system of claim 1 further including a narrow band filter incorporated in the photodetector.

5. The optical system of claim 1 wherein the gratings are tilted Bragg gratings that have a grating period less than the vacuum wavelength divided by the mode effective index.

6. The optical system of claim 1 wherein the gratings are long period gratings.

7. The optical system of claim 1 wherein the gratings are chirped gratings.

8. The optical system of claim 1 wherein the photodetectors comprise semiconductor diodes.

9. The optical system of claim 1 wherein the lightwave signal is a WDM signal.

10. The optical system of claim 1 wherein the gratings select less than 10% of the optical power of the signal wavelength.

11. The optical system of claim 1 wherein the signal wavelengths are separated by >20 nm.

12. The optical system of claim 1 wherein the photodetectors provide a monitoring signal and the monitoring signal activates a feedback loop to a source of the signal.

13. The optical system of claim 1 wherein the photodetectors provide a monitoring signal and the monitoring signal activates a feedback loop to a dynamic wavelength or channel dependent attenuator.

14. The optical system of claim 1 wherein the wavelength selection means select channels from a multiplexed signal, and the channels are separated by >10 nm.

* * * * *